United States Patent
Lee

(10) Patent No.: US 10,868,489 B2
(45) Date of Patent: *Dec. 15, 2020

(54) HYBRID ELECTRIC VEHICLE AND MOTOR CONTROL METHOD FOR THE SAME

(71) Applicants: HYUNDAI MOTOR COMPANY, Seoul (KR); KIA MOTORS CORPORATION, Seoul (KR)

(72) Inventor: Jea Mun Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 169 days.

This patent is subject to a terminal disclaimer.

(21) Appl. No.: 16/183,416

(22) Filed: Nov. 7, 2018

(65) Prior Publication Data

US 2019/0140578 A1 May 9, 2019

(30) Foreign Application Priority Data

Nov. 7, 2017 (KR) .................. 10-2017-0147218

(51) Int. Cl.
| | |
|---|---|
| B60H 1/00 | (2006.01) |
| H02P 29/60 | (2016.01) |
| B60W 20/15 | (2016.01) |
| B60W 10/30 | (2006.01) |
| B60W 10/08 | (2006.01) |

(Continued)

(52) U.S. Cl.
CPC .............. *H02P 29/60* (2016.02); *B60K 6/442* (2013.01); *B60W 10/06* (2013.01); *B60W 10/08* (2013.01);
(Continued)

(58) Field of Classification Search
CPC ....... H02P 29/60; B60W 20/12; B60W 20/15; B60W 10/06; B60W 10/08; B60W 10/30;
(Continued)

(56) References Cited

U.S. PATENT DOCUMENTS

| | | |
|---|---|---|
| 2011/0288712 A1 | 11/2011 | Wang et al. |
| 2015/0197235 A1* | 7/2015 | Yu .................. B60W 10/06 701/22 |

(Continued)

FOREIGN PATENT DOCUMENTS

| | | |
|---|---|---|
| DE | 10 2009 046 568 A1 | 5/2011 |
| EP | 1842758 A1 | 10/2007 |

(Continued)

OTHER PUBLICATIONS

Extended European Search Report of corresponding European Patent Application No. 18204986.6—7 pages (dated May 2, 2019).

*Primary Examiner* — Geepy Pe
*Assistant Examiner* — Tiffany P Ohman
(74) *Attorney, Agent, or Firm* — McDonnell Boehnen Hulbert & Berghoff LLP

(57) ABSTRACT

A hybrid electric vehicle is capable of preventing over-temperature of an electric motor when the vehicle travels using only the output of the electric motor without driving an engine while passing through a specific zone using route information to a destination and a motor control method for the same. The motor cooling control method includes, when determined that a specific zone related to discharge of exhaust gas is present on a traveling route, determining a target motor temperature to be reached when entering the specific zone, determining a cooling distance necessary to reach the target motor temperature, determining the time at which to start cooling control using the determined cooling distance, and restricting a motor-driving range from the time at which to start the cooling control until entering the specific zone.

19 Claims, 8 Drawing Sheets

(51) Int. Cl.
*B60W 10/06* (2006.01)
*B60K 6/442* (2007.10)
*B60W 30/184* (2012.01)
*B60W 20/12* (2016.01)
*B60W 50/00* (2006.01)

(52) U.S. Cl.
CPC ............ *B60W 10/30* (2013.01); *B60W 20/12* (2016.01); *B60W 20/15* (2016.01); *B60W 30/1843* (2013.01); *B60W 50/0097* (2013.01); *B60W 2510/087* (2013.01); *B60W 2555/60* (2020.02); *B60W 2556/50* (2020.02); *B60W 2710/088* (2013.01)

(58) Field of Classification Search
CPC ......... B60W 30/1843; B60W 50/0097; B60W 2556/50; B60W 2555/60; B60W 2510/087; B60W 2710/088; B60K 6/442
USPC .......................................................... 701/22
See application file for complete search history.

(56) References Cited

U.S. PATENT DOCUMENTS

| | | | |
|---|---|---|---|
| 2017/0088003 A1* | 3/2017 | Yu | B60L 50/15 |
| 2018/0186390 A1* | 7/2018 | Lavertu | B61L 3/006 |
| 2018/0257473 A1* | 9/2018 | Follen | B60L 53/64 |
| 2018/0281774 A1* | 10/2018 | Fukuda | B60W 50/0097 |

FOREIGN PATENT DOCUMENTS

| | | |
|---|---|---|
| EP | 2689982 A1 | 1/2014 |
| EP | 2765019 A2 | 8/2014 |
| IE | 10 2014 004 817 A1 | 10/2015 |

* cited by examiner

HYBRID ELECTRIC VEHICLE AND MOTOR CONTROL METHOD FOR THE SAME

This application claims the benefit of Korean Patent Application No. 10-2017-0147218, filed on Nov. 7, 2017, which is hereby incorporated by reference as if fully set forth herein.

BACKGROUND

Field

The present disclosure relates to a hybrid electric vehicle and a motor control method for the same.

Discussion of the Related Art

In general, a hybrid electric vehicle (HEV) is a vehicle that uses two kinds of power sources, an internal combustion engine and an electric motor. In recent years, extensive research has been conducted into hybrid electric vehicles, since hybrid electric vehicles exhibit higher fuel economy, higher power performance, and lower discharge of exhaust gas than vehicles having only internal combustion engines.

A hybrid electric vehicle may operate in two traveling or driving modes based on connection of the powertrain thereof. One of the traveling modes is an electric vehicle (EV) mode, in which the hybrid electric vehicle is driven using only the electric motor, and another is a hybrid electric vehicle (HEV) mode, in which the hybrid electric vehicle is driven using both the electric motor and the engine. Based on the traveling conditions, the hybrid electric vehicle switches between the two modes.

SUMMARY

Accordingly, the present disclosure is directed to a hybrid electric vehicle and a motor control method for the same, and more particularly, directed to a hybrid electric vehicle capable of preventing over-temperature of an electric motor in the case in which the vehicle travels using only the output of the electric motor without driving an engine while passing through a specific zone using route information to a destination and a motor control method for the same.

An aspect of the present invention is to provide a method of controlling an electric motor so as to further meet the demand for environmental friendliness and a hybrid electric vehicle for performing the method.

Another aspect of the present invention is to provide a method of minimizing the operation of an engine in a specific zone by preventing over-temperature of an electric motor and a hybrid electric vehicle for performing the method.

Additional advantages, aspects, and features of the invention will be set forth in part in the description which follows and in part will become apparent to those having ordinary skill in the art upon examination of the following or may be learned from practice of the invention. The aspects and other advantages of the invention may be realized and attained by the structure particularly pointed out in the written description and claims hereof as well as the appended drawings.

To achieve these and other advantages of the invention, as embodied and broadly described herein, a motor cooling control method for a hybrid electric vehicle includes, when determined that a specific zone related to discharge of exhaust gas is present on a traveling route, determining a target motor temperature, which is a motor temperature to be reached when entering the specific zone, determining a cooling distance necessary to reach the target motor temperature, determining the time at which to start cooling control using the determined cooling distance, and restricting a motor-driving range from the time at which to start the cooling control until entering the specific zone.

In another aspect of the present invention, a hybrid electric vehicle includes a first control unit for, when determined that at least one specific zone related to discharge of exhaust gas is present on a traveling route, acquiring information about the traveling route comprising the at least one specific zone, and a second control unit for determining a target motor temperature, which is a motor temperature to be reached when entering the specific zone, and a cooling distance necessary to reach the target motor temperature using the information received from the first control unit, determining the time at which to start cooling control based on the determined cooling distance, and performing control so as to restrict a motor-driving range from the time at which to start the cooling control until entering the specific zone.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Figure 1:
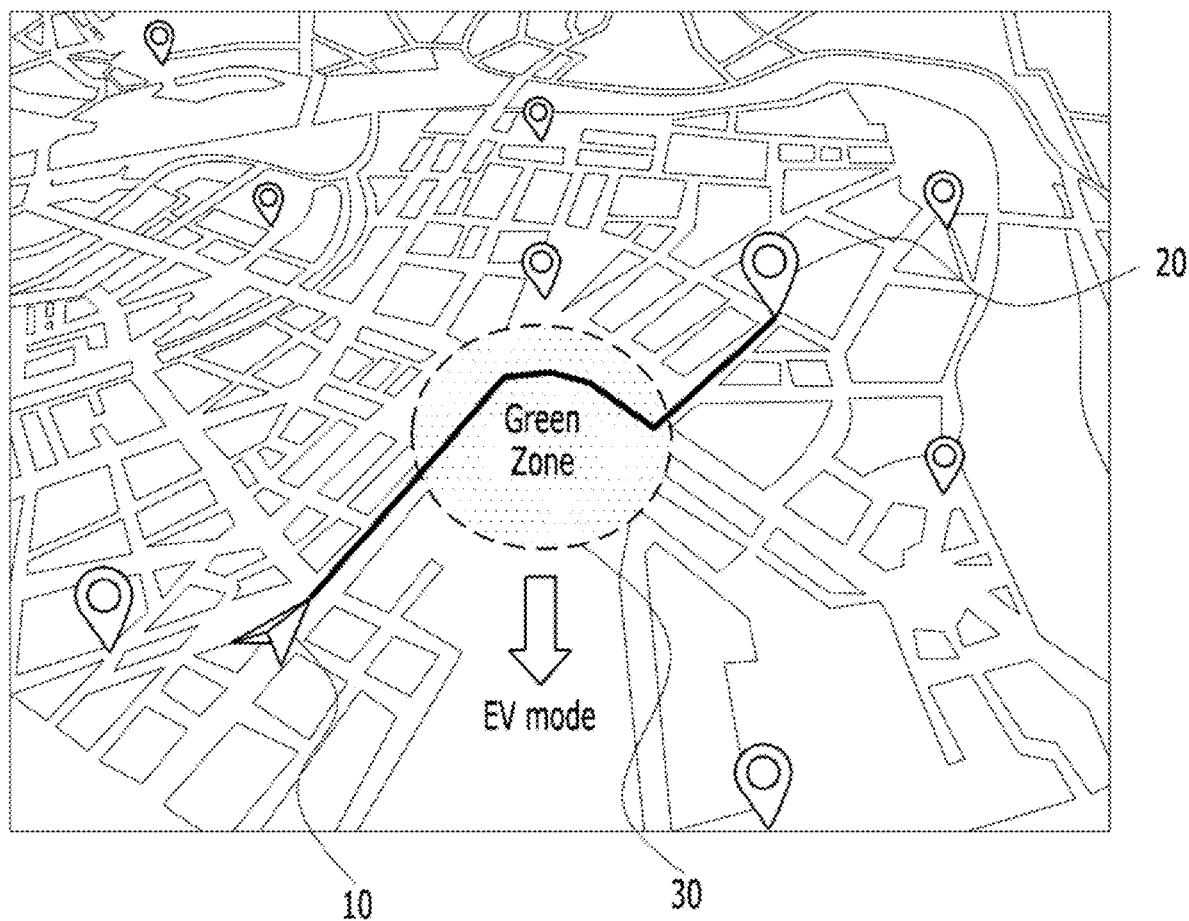
FIG. 1 is a view illustrating the concept of a specific zone to which embodiments of the present invention are applicable.

Reference will now be made in detail to embodiments of the present invention, examples of which are illustrated in the accompanying drawings. The following embodiments are given by way of example in order to enable those skilled in the art to fully understand the idea of the present invention. Therefore, the present invention is not limited by the following embodiments, and may be realized in other forms. In order to clearly describe embodiments of the present invention, parts having no relation with the description of embodiments of the present invention have been omitted from the drawings. Wherever possible, the same reference numerals will be used throughout the specification to refer to the same or like parts.

The term "comprises" or "includes" used herein should be interpreted not to exclude other elements but to further include such other elements, since the corresponding elements may be inherent unless mentioned otherwise. In addition, parts denoted by the same reference numerals throughout the specification indicate the same elements.

To date, the driving control of hybrid electric vehicles has been focused on fuel efficiency. However, in addition to improving fuel efficiency, hybrid electric vehicles have recently been requested to prevent environmental pollution when traveling through specific zones. With the recent increasing demand for and regulations governing environmental friendliness, zones in which a reduction of exhaust gas is required have been set in an explicit or implied manner due to regulations, environmental friendliness, safety, pedestrian concentration, etc. In order to drive a vehicle in these zones, it is preferable for the vehicle to be driven in an EV mode, in which an engine is not operated.

However, in an environment in which the operation of the engine is not appropriate, if over-temperature or overheat of the electric motor occurs, the vehicle cannot be driven in the EV mode any longer as it is not appropriate to operate either the motor or the engine.

Prior to describing a motor control method according to an embodiment of the present invention, the concept of a zone in which the operation of an engine is restrained will be described with reference to FIG. 1.

FIG. 1 is a view illustrating the concept of a specific zone to which embodiments of the present invention are applicable.

Referring to FIG. 1, it is assumed that, in embodiments of the present invention, in a specific zone 30, the amount of exhaust gas is required to be reduced to a predetermined level or the discharge of exhaust gas is prohibited. The specific zone may be located between a departure location 10 and a destination location 20 of a vehicle. The specific zone 30 may be a zone that is set in advance or a zone that is temporarily set in consideration of the situation, such as, air qualities, special events attracting people. In embodiments, the zone that is set in advance may be a zone set according to regulations or government policies (for example, an exhaust gas control zone in London, Seoul, etc.) or a zone in which the amount of exhaust gas is required to be reduced according to regional characteristics (for example, a child protection zone, an indoor parking lot, a residential district, etc.).

In embodiments, the zone that is temporarily set may be a zone in which a determination as to whether the zone is currently set can be made through wireless information such as telematics, a pedestrian concentration zone determined through a vision information acquisition device (e.g. an ADAS system, etc.) provided in a vehicle, an indoor environment, or a zone indicated by recognizable signs. In embodiments, when the atmospheric characteristics or air qualities of a zone, based on the reference to atmospheric environment information, become worse, the zone may be temporarily set as a specific zone 30. When a zone is determined to be a pedestrian concentration zone based on big data utilizing location information of mobile phones, the zone may be temporarily set as a specific zone 30. When a zone is estimated to be a place in which a large amount of exhaust gas is generated based on the average speed of vehicles and the amount of traffic collected through a telematics service, the zone may be set as a specific zone 30.

The specific zone 30 may be set as an arbitrary administrative district unit, as a zone that interconnects a plurality of coordinates that become border points, as the entirety or a portion of a specific facility, or as a zone within a predetermined radius from a specific facility or coordinates.

Of course, the above examples of setting of the specific zone are merely illustrative. The embodiments of the present invention are not limited thereto. In other embodiments, there would be different rules, regulations, standards or formulas for setting or designating specific zones, the area of specific zones, timing for setting the specific zones or releasing from the designation of the specific zone. In addition, although it is assumed that the specific zone 30 is located between the departure location 10 and the destination location 20, it is not required for a user to necessarily set the destination 20 on a navigation function of an audio/video/navigation (AVN) system. For example, the destination 20 may be set by a vehicle depending on a driver's driving pattern or predetermined traveling conditions (time, zone, etc.). For determining driving mode, however, the presence or absence of such a specific zone 30 on a route and the size of the specific zone 30 may be determined by a vehicle before entering the specific zone 30 during the driving of the vehicle or before leaving the departure location.

In the following description, a specific zone in which the amount of exhaust gas is required to be reduced or in which the discharge of exhaust gas is prohibited will be referred to as a "green zone" for the sake of convenience.

Next, the structure of a hybrid electric vehicle to which embodiments of the present invention are applicable will be described with reference to FIG. 2.

Figure 2:
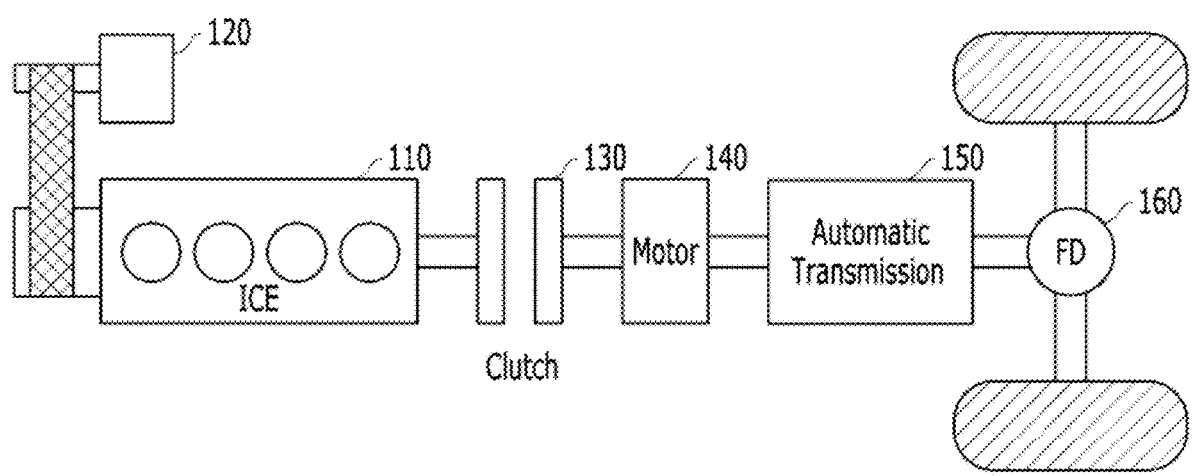
FIG. 2 is a view showing an example of a powertrain structure of a hybrid electric vehicle to which embodiments of the present invention are applicable.

FIG. 2 is a view showing an example of a powertrain structure of a hybrid electric vehicle to which embodiments of the present invention are applicable.

Referring to FIG. 2, there is shown a powertrain of a hybrid electric vehicle adopting a parallel-type hybrid system, having an electric motor (or a drive motor) 140 and an engine clutch (EC) 130 mounted between an internal combustion engine (ICE) 110 and a transmission 150.

In such a vehicle, when a driver steps on an accelerator pedal after starting, the motor 140 is first driven using electric power from a battery in the state in which the engine clutch 130 is open, and then power from the motor 140 is transmitted to the wheels via the transmission 150 and a final drive (FD) 160 in order to rotate the wheels (i.e. an EV mode). When higher driving force is needed as the vehicle is gradually accelerated, an auxiliary motor (or a starter/generator motor) 120 may be operated to start the engine 110.

When the rotational speeds of the engine 110 and the motor 140 become equal, the engine clutch 130 is locked, with the result that both the engine 110 and the motor 140 drive the vehicle, or the engine 110 alone drives the vehicle (i.e. transition from the EV mode to an HEV mode). When a predetermined engine off condition is satisfied, for example, when the vehicle is decelerated, the engine clutch 130 is opened, and the engine 110 is stopped (i.e. transition from the HEV mode to the EV mode). In addition, when the hybrid electric vehicle is braked, driving force or rotation of the wheels may be converted into electrical energy, which may be used to charge the battery, which is referred to as recovery of braking energy or regenerative braking.

The starter/generator motor 120 acts as a start motor when starting the engine and as a generator after starting the engine, at the time of engine stop, or when engine rotation energy is collected. Therefore, the starter/generator motor 120 may be referred to as a "hybrid start generator (HSG)". Depending on the circumstances, the starter/generator motor 120 may also be referred to as an "auxiliary motor".

Figure 3:
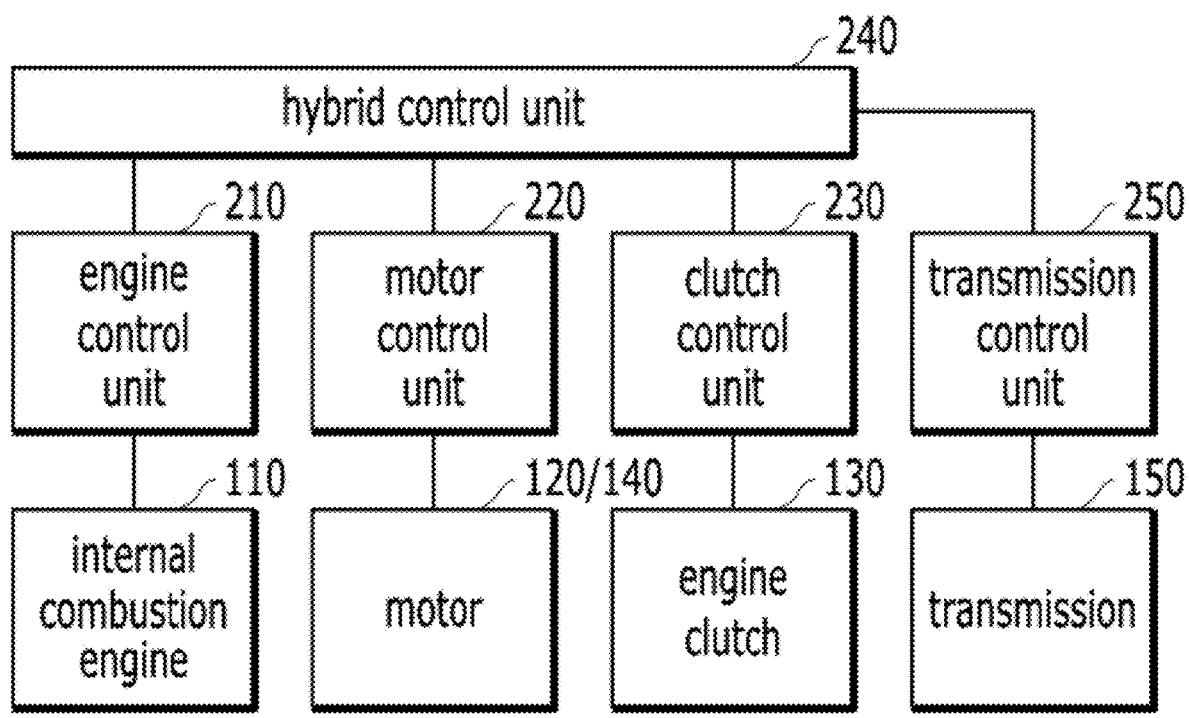
FIG. 3 is a block diagram showing an example of the control system of the hybrid electric vehicle to which embodiments of the present invention are applicable.

The relationships between control units or controllers of the vehicle using the powertrain are shown in FIG. 3.

FIG. 3 is a block diagram showing an example of the control system of the hybrid electric vehicle to which embodiments of the present invention are applicable.

Referring to FIG. 3, in the hybrid electric vehicle to which embodiments of the present invention are applicable, the internal combustion engine 110 may be controlled by an engine control unit 210, the torque of the starter/generator motor 120 and the electric motor 140 may be controlled by a motor control unit (MCU) 220, and the engine clutch 130 may be controlled by a clutch control unit 230. The engine control unit 210 may also be referred to as an engine management system (EMS). In addition, the transmission 150 is controlled by a transmission control unit 250. Depending on the circumstances, the starter/generator motor 120 and the electric motor 140 may be controlled by different motor control units.

Each control unit may be connected to a hybrid control unit (HCU) 240, which is an upper controller that controls an overall mode-switching process. Under the control of the hybrid control unit 240, each control unit may provide information necessary for engine clutch control at the time of switching traveling or driving modes or shifting gears and/or information necessary for engine stop control to the hybrid control unit 240, or may perform an operation in response to a control signal from the hybrid control unit 240.

More specifically, the hybrid control unit 240 determines whether to perform mode switching based on the traveling or operation state of the vehicle. For example, the hybrid control unit 240 may determine the open time of the engine clutch 130, and when the engine clutch 130 is opened, may perform hydraulic control (for a wet-type engine clutch) or torque capacity control (for a dry-type engine clutch). In addition, the hybrid control unit 240 may determine the state (lockup, slip, or open) of the engine clutch 130, and may control the time at which to interrupt the injection of fuel into the engine 110. In addition, the hybrid control unit 240 may transmit a torque command for controlling the torque of the starter/generator motor 120 in order to perform engine stop control to the motor control unit 220, whereby it is possible to control the collection of engine rotation energy. Furthermore, the hybrid control unit 240 may control a lower control unit for determining mode-switching conditions and performing mode switching at the time of controlling adaptive mode switching according to embodiments of the present invention, a description of which will follow.

Of course, it can be understood by those skilled in the art that the relationships between the control units and the functions/classification of the control units are illustrative, and not restricted by the names thereof. For example, the hybrid control unit 240 may be configured such that one of the other control units excluding the hybrid control unit 240 provides the corresponding function or such that two or more thereof provide the corresponding function in a distributed fashion. Although a transmission-mounted-electric-device (TMED)-type parallel hybrid electric vehicle has been described with reference to FIGS. 2 and 3, this type of vehicle is illustrative only. Consequently, the embodiments of the present invention are not limited as to the type of the hybrid electric vehicle.

Hereinafter, a more efficient cooling control method according to an embodiment of the present invention will be described based on the structure of the vehicle described above.

In embodiments, upon determining that a green zone is present on a traveling route using travelling route information, for example, the information from a navigator, the embodiment of the present invention proposes to cool the motor or maintain the temperature of the motor lower than a preset value, expecting that the temperature will increase in the green zone, in advance before entering the green zone in order to prevent over-temperature or overheat of an electric motor when the vehicle is driven in the EV mode using the motor in the green zone.

To this end, in an aspect of this embodiment, a target motor temperature may be determined in advance, and then the time at which to perform motor cooling control may be determined based on the target motor temperature. In embodiments, the target motor temperature may be a motor temperature to be reached immediately before entering the green zone or at the time of entering the green zone. The time at which to perform motor cooling control may be the time at which the current remaining distance until entering the green zone is equivalent to the traveling distance necessary to reach the target motor temperature (hereinafter, referred to as a "cooling distance" for the sake of convenience).

In addition, in an aspect of this embodiment, the travelling route information may be navigation information. In embodiments, the navigation information may include at least one of the presence or absence of a green zone, road types, the slope of roads, an average vehicle speed, or a degree of congestion (real-time traffic information). In general, the navigation information may be acquired through a navigation system, i.e. an audio/video/navigation (AVN) system. However, the present invention is not limited thereto. For example, the navigation information may be acquired from a telematics center through a telematics unit, or may be acquired through data center/server/cloud access using a wireless communication module. Information about the vehicle speed may be acquired using various sensors in the vehicle.

Figure 4:
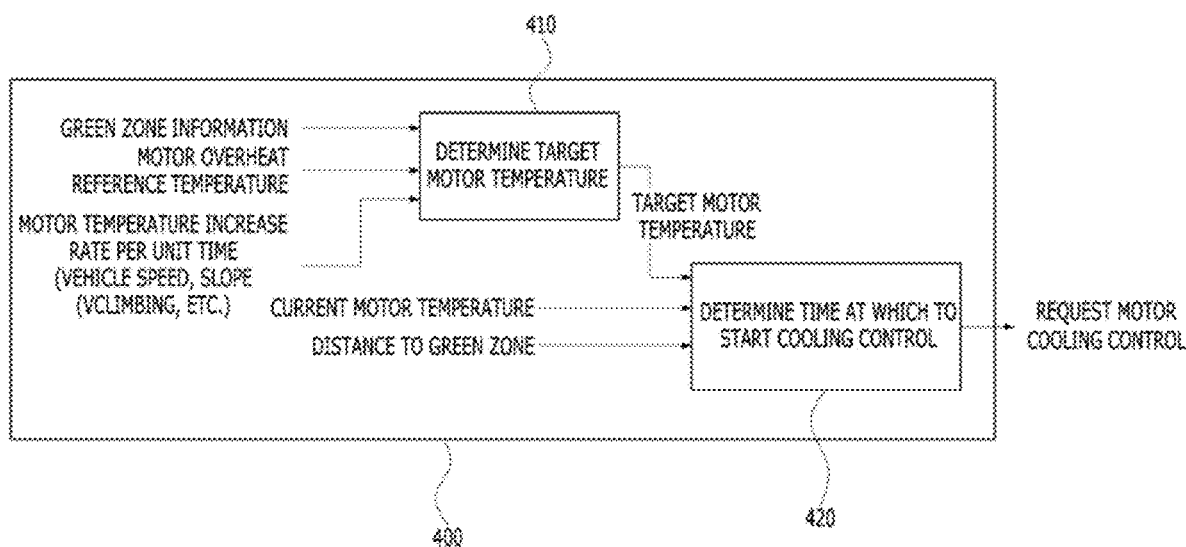
FIG. 4 is a view illustrating an example of the structure of control logic for motor cooling control according to an embodiment of the present invention.
Figure 5:
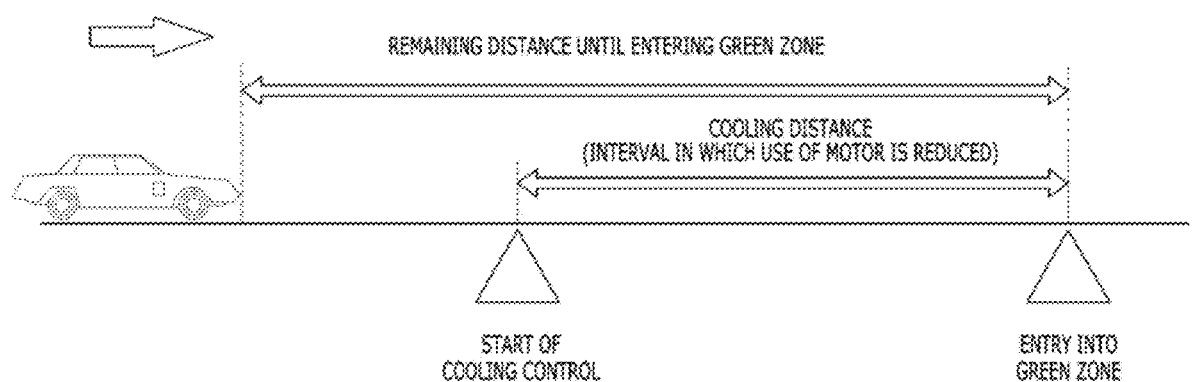
FIG. 5 is a view illustrating a method of determining the time at which to perform motor cooling control according to an embodiment of the present invention.

Hereinafter, the determination of the target motor temperature and the time at which to perform cooling control will be described in detail with reference to FIGS. 4 and 5. FIG. 4 is a view illustrating an example of the structure of control logic for an engine operation request according to an embodiment of the present invention, and FIG. 5 is a view illustrating a method of determining the time at which to perform cooling control according to an embodiment of the present invention.

Referring to FIG. 4, control logic 400 according to this embodiment may include a target motor temperature determination unit 410 and a cooling control timing determination unit 420.

First, the target motor temperature determination unit 410 may determine a target motor temperature using at least one of information about a green zone, a motor overheat reference temperature, or a motor temperature increase rate per unit time. In embodiments, the information about the green zone may include at least one of the traveling distance in the green zone, a vehicle speed limit, the amount of traffic, or signal information, which may be acquired through the navigation information. In addition, the motor overheat reference temperature may mean the temperature at which to stop the operation of the electric motor to protect the same. The motor overheat reference temperature may be a predetermined value, or may vary depending on the kind of an electric motor. In addition, the motor temperature increase rate per unit time indicates the extent to which the motor temperature is increased over the time during which the motor is operated. The motor temperature increase rate per unit time may be determined in consideration of a traveling load and an average vehicle speed in the green zone. For example, when the vehicle climbs up a slope at a high speed, the motor temperature is rapidly increased. In the opposite case, the motor temperature is slowly increased.

Details of a method of determining the target motor temperature based on the above information according to embodiments is as follows.

The target motor temperature $T_{\_Target}$ is determined based on the motor temperature change rate per unit time $\Delta T$, the green zone traveling time t, and the motor overheat reference temperature $T_{\_OverHeat}$, as expressed in Equation 1 below.

$$T_{\_Target} = T_{\_OverHeat} - (\Delta T * t) \quad \text{[Equation 1]}$$

In embodiments, the target motor temperature is the value obtained by subtracting an expected motor temperature increase due to the operation of the motor while passing through the green zone from the motor overheat reference temperature. When the motor overheat reference temperature $T_{\_OverHeat}$ is predetermined, the target motor temperature is substantially determined by the motor temperature change rate per unit time $\Delta T$ and the green zone traveling time t. The motor temperature change rate per unit time is the same as what has been described above, and the green zone traveling time t may be determined by the traveling distance in the green zone and the traveling vehicle speed. In embodiments, the traveling distance in the green zone is a value dependent on a green zone setting state, and the traveling vehicle speed may be determined through the amount of traffic, signal information, etc. based on the vehicle speed limit in the green zone.

The target motor temperature determined by the target motor temperature determination unit 410, as described above, is transmitted to the cooling control timing determination unit 420. When determining the time at which to perform motor cooling control, the cooling control timing determination unit 420 avoids unnecessary cooling control while cooling the motor to the target motor temperature before entering the green zone in order to minimize deterioration in efficiency attributable to cooling control.

In embodiments, for accurately estimating the cooling distance that is a driving distance necessary for the motor temperature to reach the target motor temperature, the cooling distance may be obtained as expressed in Equation 2 below.

$$D_{\_Down} = T_{\_Down} * V_{\_Mean} * K \quad \text{[Equation 2]}$$

According to Equation 2, the cooling distance $D_{\_Down}$ may be expressed by the product of the required temperature decrease $T_{\_Down}$ (=the target motor temperature−the current motor temperature), the average vehicle speed until reaching the green zone $V_{\_Mean}$, and the cooling time K required for decreasing a unit temperature (for example, 1° C.)

The greater the required temperature decrease is, the longer the cooling distance is needed. On the other hand, the smaller the required temperature decrease is, the shorter the cooling distance is needed. In addition, the average vehicle speed to the green zone $V_{\_Mean}$ may be determined in consideration of the amount of traffic, signal information, etc. based on the vehicle speed limit until the green zone. Furthermore, the cooling time K required for decreasing a unit temperature depends on the motor temperature decrease rate per unit time at which cooling control is performed in accordance with the motor operation amount, may vary depending on the characteristics of the electric motor and the cooling system. The cooling time K required for decreasing a unit temperature may be determined using the heat transfer equation or experiments under the condition in which the use of the motor is restrained.

When the cooling distance is determined as described above, the cooling control timing determination unit 420 may determine to start cooling control at the time at which the remaining distance until entering the green zone becomes equal to or less than the cooling distance, as shown in FIG. 5, in order to prevent unnecessary cooling control.

In an aspect of this embodiment, when realizing the control logic 400, the target motor temperature determination unit 410 and the cooling control timing determination unit 420 may be realized by the same control unit or by different control units or controllers. For example, the functions of the target motor temperature determination unit 410 and the cooling control timing determination unit 420 may be realized so as to be performed by the hybrid control unit. In embodiments, the hybrid control unit may acquire information about the green zone from the AVN system, and may acquire the motor overheat reference temperature from the motor control unit, or may store the motor overheat reference temperature in an internal memory thereof in advance.

In addition, information about the current motor temperature may be acquired from the engine control unit. Furthermore, a motor cooling control request may be performed in a manner in which a torque command within a range within which the motor temperature is decreased is transmitted to the motor control unit. In another aspect of this embodiment, the above-described functions of the control logic may be performed by the motor control unit, in which case the motor cooling control request may be transmitted to the hybrid control unit. Alternatively, a separate control unit may be provided in order to perform this logic.

In general, when a driver demand power does not exceed a predetermined demand power (e.g. the maximum output of the motor in consideration of electrical load), the hybrid control unit performs EV mode traveling control. In the opposite case, the hybrid control unit changes the traveling mode to the HEV mode. In the HEV mode, the difference between the driver demand power and the predetermined demand power is adjusted within the maximum output range of the electric motor through a charging/discharging operation of the electric motor based on an optimal operating point of the engine. When the difference between the driver demand power and the predetermined demand power exceeds the maximum output range of the electric motor, it is common to correct the operating point.

According to this embodiment, however, when the motor cooling control is started, the hybrid control unit restricts the usage of the motor. To this end, the hybrid control unit may control the operation of the engine and the operating point of the engine in a variable fashion.

A detailed description thereof will now be made with reference to FIGS. 6 and 7.

Figure 6:
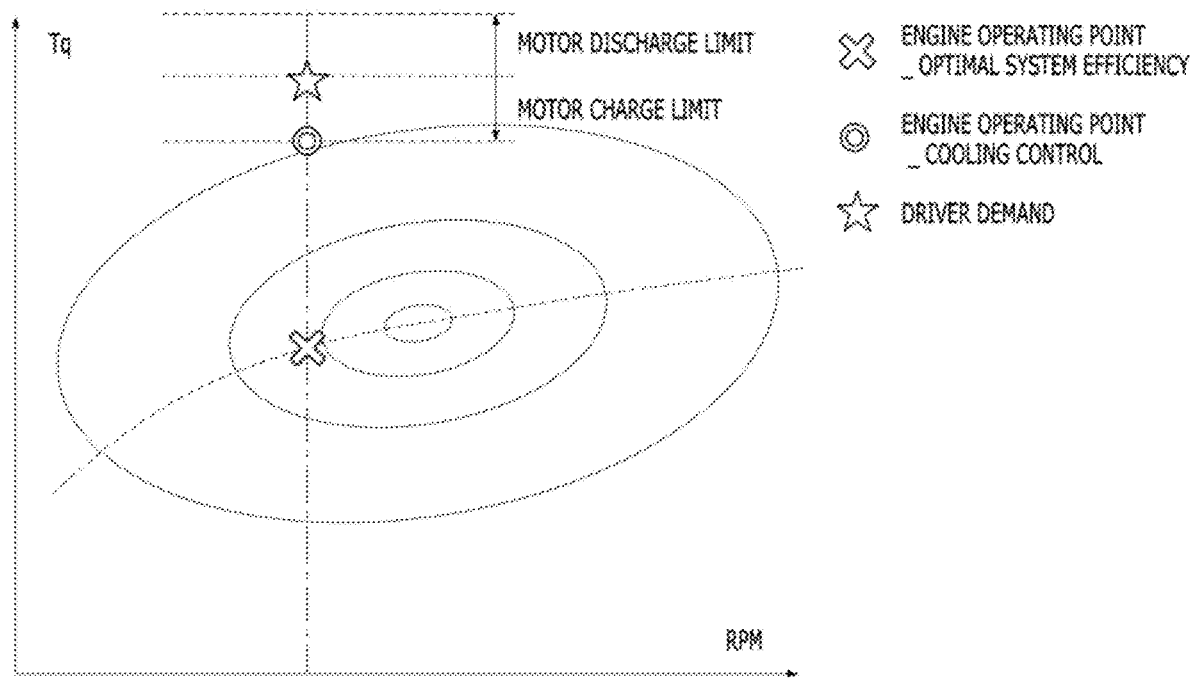
FIG. 6 is a view showing an example of correction of an engine operating point due to high demand torque when cooling control is performed according to an embodiment of the present invention.
Figure 7:
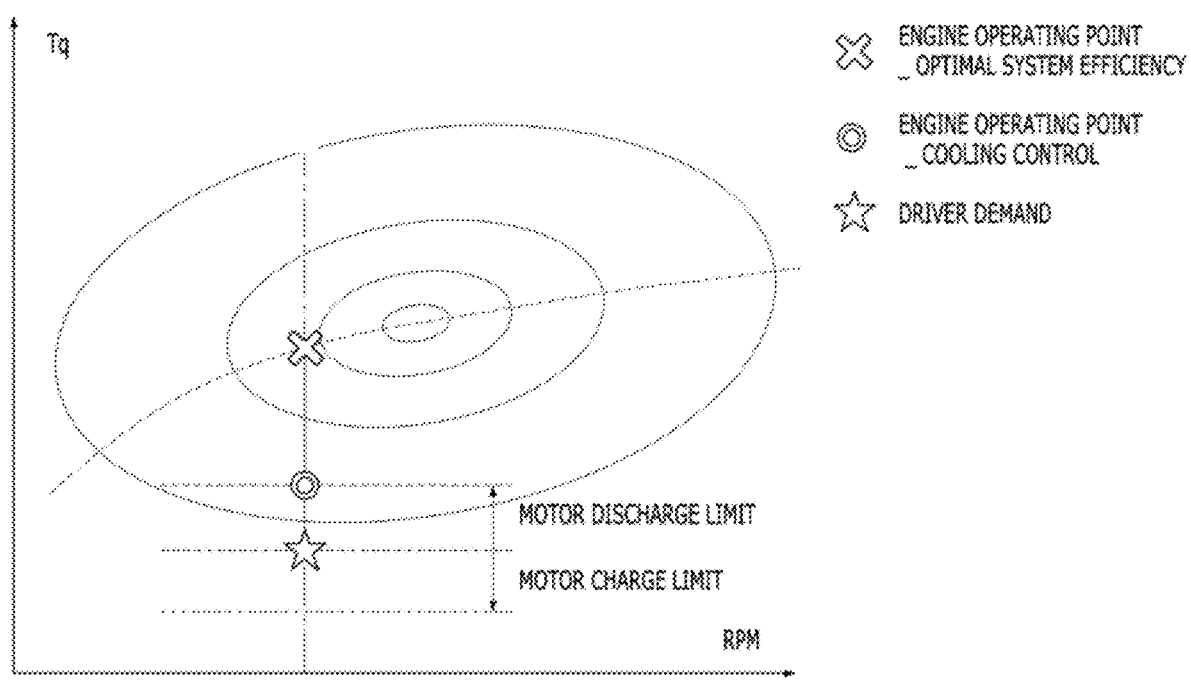
FIG. 7 is a view showing an example of correction of an engine operating point due to low demand torque when cooling control is performed according to an embodiment of the present invention.

FIG. 6 is a view showing an example of correction of an engine operating point due to high demand torque when cooling control is performed according to an embodiment of the present invention, and FIG. 7 is a view showing an example of correction of an engine operating point due to low demand torque when cooling control is performed according to an embodiment of the present invention. In both FIG. 6 and FIG. 7, it is assumed that the motor is driven within predetermined limit ranges of charge torque and discharge torque thereof and that the operation of the motor within these limit ranges does not interrupt the motor cooling.

Referring to FIG. 6, in the state in which the driver demand torque (★) is higher than the engine operating point (×) for optimal system efficiency, when the difference between the driver demand torque and the engine operating point (×) for optimal system efficiency is equal to or less than the maximum discharge torque of the motor, a typical hybrid vehicle performs control such that the engine operating point follows the operating point for optimal system efficiency. When the motor cooling control according to this embodiment is performed, however, the operation of the electric motor is restricted so as not to exceed the discharge limit range. Therefore, during the cooling control, in order to cool the motor, the engine operating point may be moved to a point (○) at which high torque is generated in spite of a slight deterioration in efficiency.

Next, referring to FIG. 7, in the state in which the driver demand torque (★) is lower than the engine operating point (×) for optimal system efficiency, when the difference between the driver demand torque and the engine operating point (×) for optimal system efficiency is equal to or less than the maximum charge torque of the motor, a typical hybrid vehicle performs control such that the engine operating point follows the operating point for optimal system efficiency. When the motor cooling control according to this embodiment is performed, however, the operation of the electric motor is restricted so as not to exceed the charge limit range. Therefore, during the cooling control, in order to cool the motor, the engine operating point may be moved to a point (○) at which low torque is generated in spite of a slight deterioration in efficiency.

In summary, before entering the green zone from the time at which the cooling control has been started, the engine operating point may be controlled so that the torque obtained by subtracting the torque within the motor-driving range from the driver demand torque (i.e. motor discharge limit range>subtracted torque>motor charge limit range) is satisfied using engine torque. In one embodiment, the hybrid control unit may determine the motor torque and the engine torque so that the electric motor is driven within predetermined limit ranges of charge torque and discharge torque thereof and so that the sum of the motor torque and the engine torque satisfy the driver demand torque, and may transmit torque commands corresponding thereto to the motor control unit and the engine control unit.

The control logic according to the embodiment described above may be summarized as shown in FIG. 8.

Figure 8:
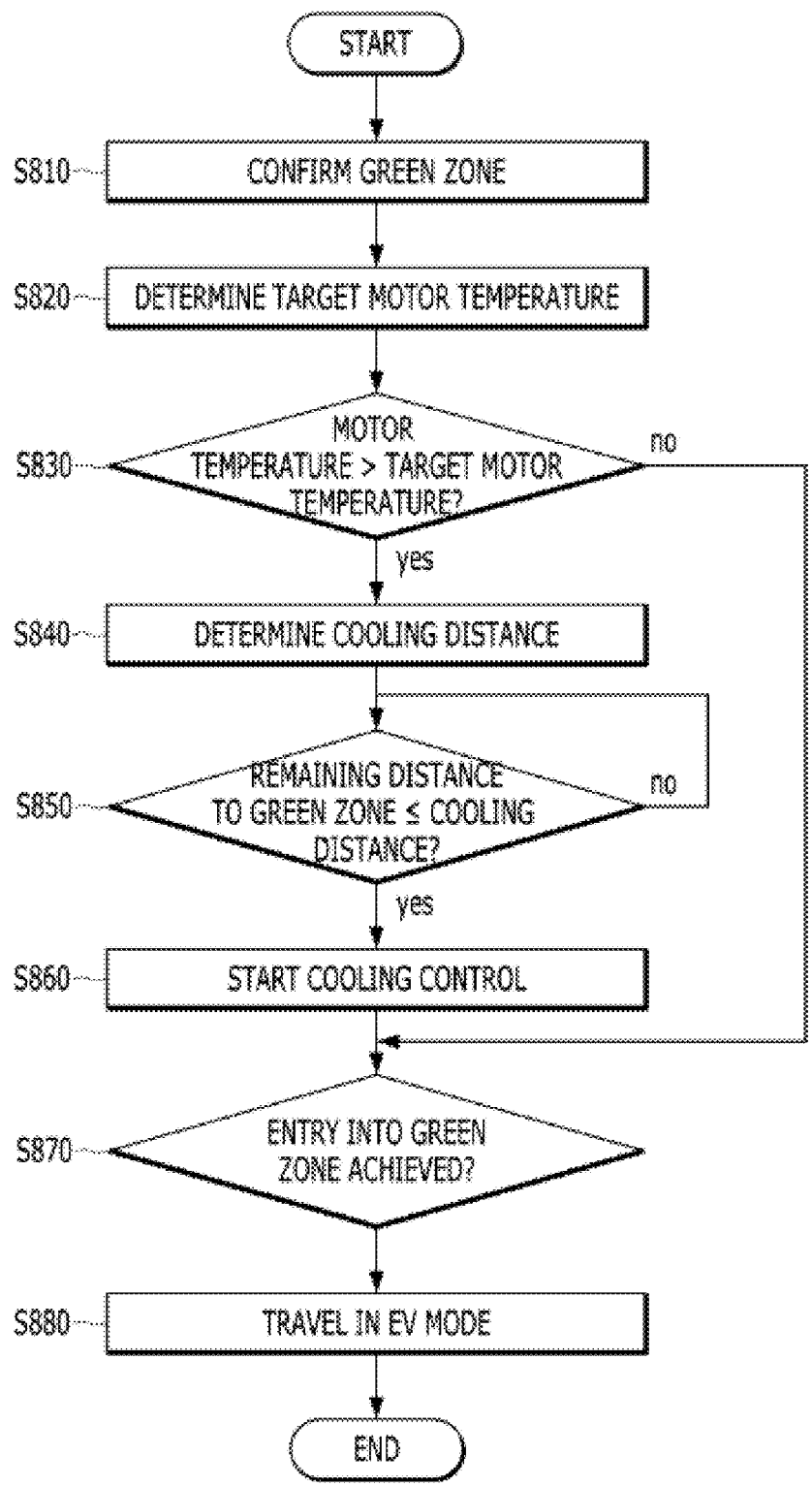
FIG. 8 is a flowchart showing an example of a motor cooling control process of a hybrid electric vehicle according to an embodiment of the present invention.

FIG. 8 is a flowchart showing an example of a motor cooling control process of a hybrid electric vehicle according to an embodiment of the present invention.

Referring to FIG. 8, a green zone on a traveling route may be confirmed (S810). In embodiments, "confirmation" may mean determination as to whether at least one green zone is present on the route and the acquisition of information about the green zone when such a green zone is present on the route.

When the green zone on the traveling route is confirmed, a target motor temperature may be determined (S820). The method of obtaining the target motor temperature may be derived from Equation 1, described with reference to FIG. 4, and therefore a duplicate description thereof will be omitted for simplicity of the specification.

When the target motor temperature is determined, the target motor temperature may be compared with the current motor temperature (S830). When the current motor temperature is higher than the target motor temperature as the result of the comparison (i.e. when determined that motor cooling is necessary), a cooling distance may be determined or calculated (S840). The method of determining the cooling distance may also be derived from Equation 2, described with reference to FIG. 4, and therefore a duplicate description thereof will be omitted.

When the cooling distance is determined, the cooling distance may be compared with the remaining distance to the green zone (S850). When the cooling distance is equal to or greater than the remaining distance to the green zone, cooling control may be started (i.e. restrictive motor operation) (S860).

Subsequently, the cooling control may be performed until entering the green zone. Upon determining that entry into the green zone has been achieved (S870), the cooling control may be terminated, and EV mode traveling may be performed (S880).

When a plurality of green zones is present on the route, the above control process may be individually performed for each green zone.

Embodiments of the invention described above may be implemented as computer-readable code in a medium in which a program is recorded. Computer-readable recording media include all kinds of recording devices in which data readable by computer systems is stored. The computer-readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

As is apparent from the above description, a hybrid electric vehicle according to at least one embodiment of the present invention can prevent over-temperature of an electric motor when traveling through a specific zone.

Particularly, when determined that a specific zone is present on a traveling route, it is possible to decrease the temperature of a motor in advance before entering the specific zone, thereby restraining the operation of an engine attributable to over-temperature of the motor while traveling through the specific zone.

It will be appreciated by those skilled in the art that effects achievable through embodiments of the present invention are not limited to what have been particularly described hereinabove and other effects of the present invention will be more clearly understood from the above detailed description.

The above detailed description is not to be construed as limiting the present invention in any aspect, and is to be considered by way of example. The scope of the present invention should be determined by reasonable interpretation of the accompanying claims, and all equivalent modifications made without departing from the present invention should be included in the following claims.

What is claimed is:

1. A motor cooling control method operable by a hybrid electric vehicle, the method comprising:
   determining, via a navigation system of the hybrid electric vehicle, if a specific zone related to discharge of exhaust gas is present on a traveling route,
   when it is determined that the specific zone related to discharge of the exhaust gas is present on the traveling route, determining, via a hybrid control unit of the hybrid electric vehicle, a target motor temperature to be reached when entering the specific zone;
   determining, via the hybrid control unit, a cooling distance necessary to reach the target motor temperature;
   determining, via the hybrid control unit, a time at which to start cooling control using the determined cooling distance, wherein the hybrid control unit starts the cooling control at the determined time; and
   restricting, via the hybrid control unit, a motor-driving range from the determined time at which to start the cooling control until entering the specific zone.

2. The motor cooling control method according to claim 1, wherein the determining the target motor temperature comprises subtracting an expected motor temperature increase due to operation of a motor while passing through the specific zone from a motor overheat reference temperature.

3. The motor cooling control method according to claim 2, wherein the determining the target motor temperature comprises:
   determining a motor temperature change rate per unit time;
   determining an estimated traveling time in the specific zone; and
   determining the expected motor temperature increase using the motor temperature change rate per unit time and the estimated traveling time.

4. The motor cooling control method according to claim 3, wherein the motor temperature change rate per unit time is determined using at least one of a traveling load or an average vehicle speed in the specific zone, and
   wherein the estimated traveling time is determined using at least one of a traveling distance in the specific zone, a vehicle speed limit, an amount of traffic, or signal information.

5. The motor cooling control method according to claim 1, wherein the determining the cooling distance is performed using a required temperature decrease, an average vehicle speed in the specific zone, and a cooling time per unit temperature determined according to the motor-driving range.

6. The motor cooling control method according to claim 5, wherein the required temperature decrease corresponds to a difference between the target motor temperature and a current motor temperature.

7. The motor cooling control method according to claim 1, wherein the determining the time at which to start the cooling control comprises determining the time at which to start the cooling control when the cooling distance is equal to or less than a remaining distance to the specific zone.

8. The motor cooling control method according to claim 1, wherein the restricting the motor-driving range comprises changing an engine operating point so that a torque obtained by subtracting a torque within the motor-driving range from a driver demand torque is satisfied using an engine torque.

9. The motor cooling control method according to claim 1, wherein the specific zone comprises a zone in which a reduction in the discharge of exhaust gas is required.

10. A non-transitory computer-readable recording medium containing a program for performing the motor cooling control method for the hybrid electric vehicle according to claim 1.

11. A hybrid electric vehicle comprising:
    a navigation system configured to acquire information about a traveling route, wherein the navigation system is further configured to determine if the specific zone related to discharge of exhaust gas is present on the traveling route; and
    a hybrid control unit configured to determine a target motor temperature to be reached when entering the specific zone, and a cooling distance necessary to reach the target motor temperature using the information received from the navigation system, wherein the hybrid control unit is configured to determine a time at which to start cooling control based on the determined cooling distance, wherein the hybrid control unit starts the cooling control at the determined time, and wherein the hybrid control unit is further configured to perform control so as to restrict a motor-driving range from the determined time at which to start the cooling control until entering the specific zone.

12. The hybrid electric vehicle according to claim 11, wherein the hybrid control unit is configured to determine the target motor temperature by subtracting an expected motor temperature increase due to operation of a motor while passing through the specific zone from a motor overheat reference temperature.

13. The hybrid electric vehicle according to claim 12, wherein the hybrid control unit is configured to determine the expected motor temperature increase using a motor temperature change rate per unit time and an estimated traveling time.

14. The hybrid electric vehicle according to claim 13, wherein the motor temperature change rate per unit time is determined using at least one of a traveling load or an average vehicle speed in the specific zone, and
    wherein the estimated traveling time is determined using at least one selected from the group consisting of a traveling distance in the specific zone, a vehicle speed limit, an amount of traffic, and signal information.

15. The hybrid electric vehicle according to claim 11, wherein the hybrid control unit is configured to determine the cooling distance using a required temperature decrease, an average vehicle speed in the specific zone, and a cooling time per unit temperature determined according to the motor-driving range.

16. The hybrid electric vehicle according to claim 15, wherein the required temperature decrease corresponds to a difference between the target motor temperature and a current motor temperature.

17. The hybrid electric vehicle according to claim 11, wherein the hybrid control unit is configured to determine the time at which to start the cooling control when the cooling distance is equal to or less than a remaining distance to the specific zone.

18. The hybrid electric vehicle according to claim 11, wherein the hybrid control unit is configured to perform control so as to change an engine operating point so that a torque obtained by subtracting a torque within the motor-driving range from a driver demand torque is satisfied using an engine torque from the time at which to start the cooling control until entering the specific zone.

19. The hybrid electric vehicle according to claim 11, wherein the specific zone comprises a zone in which a reduction in the discharge of exhaust gas is required.

* * * * *